(12) United States Patent
Wirth

(10) Patent No.: US 7,451,769 B2
(45) Date of Patent: Nov. 18, 2008

(54) PURIFICATION UNIT

(75) Inventor: Herbert Wirth, Bamberg (DE)

(73) Assignee: Gabriele Wirth, Bamberg (DE)

( * ) Notice: Subject to any disclaimer, the term of this patent is extended or adjusted under 35 U.S.C. 154(b) by 634 days.

(21) Appl. No.: 10/495,186

(22) PCT Filed: Nov. 11, 2002

(86) PCT No.: PCT/EP02/12570

§ 371 (c)(1),
(2), (4) Date: May 11, 2004

(87) PCT Pub. No.: WO03/041553

PCT Pub. Date: May 22, 2003

(65) Prior Publication Data

US 2004/0255989 A1    Dec. 23, 2004

(30) Foreign Application Priority Data

Nov. 17, 2001  (DE) .................................. 101 56 696

(51) Int. Cl.
*B08B 3/00*   (2006.01)
*B01D 24/00*   (2006.01)

(52) U.S. Cl. .................. 134/90; 210/184; 210/185; 210/416.1; 210/510.1

(58) Field of Classification Search ................ 134/34.1, 134/63, 90, 105, 110, 111; 210/184, 185, 210/416.1, 96.1, 85, 510.1
See application file for complete search history.

(56) References Cited

U.S. PATENT DOCUMENTS

| | | | | |
|---|---|---|---|---|
| 3,608,610 | A | * | 9/1971 | Greatoerex et al. ........ 159/13.1 |
| 4,867,876 | A | * | 9/1989 | Kopf .......................... 210/228 |
| 5,343,592 | A | * | 9/1994 | Parise .......................... 15/353 |
| 5,481,780 | A | * | 1/1996 | Daneshvar ................... 15/339 |
| 6,024,927 | A | * | 2/2000 | Ban et al. .................... 422/174 |
| 6,527,146 | B1 | * | 3/2003 | Tanny et al. ........... 222/189.11 |
| 6,638,436 | B2 | * | 10/2003 | Elbern et al. ................ 210/773 |

FOREIGN PATENT DOCUMENTS

| | | |
|---|---|---|
| DE | 26 31 260 | 1/1978 |
| DE | 34 13 214 | 12/1985 |
| DE | 42 30 667 | 3/1994 |
| EP | 0657 631 | 6/1996 |
| EP | 0873 775 | 10/1998 |

* cited by examiner

*Primary Examiner*—Michael Barr
*Assistant Examiner*—Rita R Patel
(74) *Attorney, Agent, or Firm*—Collard & Roe, P.C.

(57) ABSTRACT

The invention relates to a cleaning apparatus with a filter device. The filter device contains a ceramic filter equipped with a heating device. The heating device serves for thermal sterilisation of the ceramic filter, by which allergenic substances are destroyed.

18 Claims, 3 Drawing Sheets

PURIFICATION UNIT

CROSS REFERENCE TO RELATED APPLICATIONS

Figure 1:
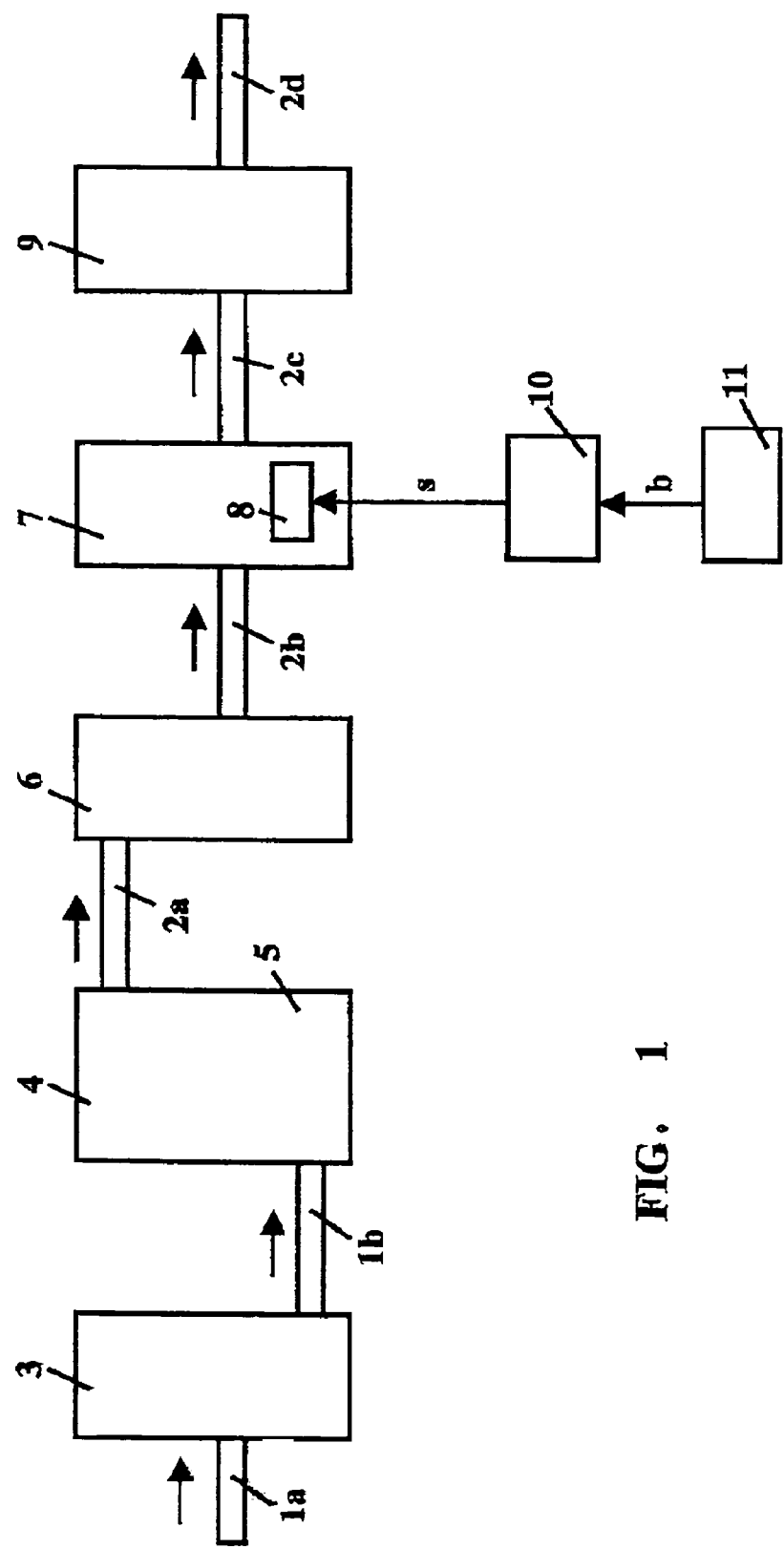

Applicant claims priority under 35 U.S.C. §119 of German Application No. 101 56 696.4 filed on Nov. 17, 2001. Applicant also claims priority under. 35 U.S.C. §365 of PCT/EP02/12570 filed on Nov. 11, 2002. The international application under PCT article 21(2) was not published in English.

DESCRIPTION

The invention relates to a cleaning apparatus. Cleaning apparatus in the sense of the invention are, for example, vacuum cleaners, air purifying apparatus and air-conditioning apparatus.

In the case of conventional vacuum cleaners, dirt particles are conveyed by suction, via an inlet channel in which a nozzle/hose system is provided, into a vacuum cleaner bag flowed through by air and are retained there. The size of the retained dirt particles is dependent on the pore size of the vacuum cleaner bag. Dirt particles which are smaller than the pore size of the vacuum cleaner bag remain in the air exiting the vacuum cleaner. Consequently, a multitude of small dirt particles float in the room in which the vacuum cleaner is used. Allergenic substances are generally also present in this air exiting the vacuum cleaner. Belonging to these are, for example, proteins, protein constituents and electrolytes which are contained in the saliva of animal hairs.

Vacuum cleaners are also already known in which the outflowing air passes a further filter by means of which an additional cleaning of the air is achieved. In the case of vacuum cleaners for sufferers of allergies this further filter is an advance.

Vacuum cleaners for sufferers of allergies must be designed, in accordance with the requirements which were formulated by the Society for Environmental and Indoor Analysis, in such a manner that, from the air, they can filter out pollen, mould fungi, bacteria, allergens and fine dust particles smaller than 10 micrometres.

In addition, vacuum cleaners are already known which use, as filter, a water container partly filled with water.

Apparatus of that kind is, for example, the subject of U.S. Pat. No. 5,343,592. The apparatus described there comprises a water container, an inlet channel led into the water container, an outlet channel led out of the water container, a filter device arranged in the outlet channel and a vacuum pump contained in the outlet channel. The stated filter device is an open-pore filter element which is mounted in a drilled-through filter holder and which is designed as a urethane filter element or as an electrostatically charged allergen filter. This filter device is provided for the purpose of filtering out contaminants having a size lying in the submicron range.

The disadvantages of filter devices of that kind consist in that the retained particles settle in the filter layer. This has the consequence that at the outset many particles still pass the filter device, but with increasing time more and more particles remain caught in the filter. The penetration characteristic of the filter thereby changes in a manner which is no longer controllable. The retained particles form a secondary filter. The flow pressure loss is ever higher the more densely the filter is occupied by particles remaining caught. Raptures can occur particularly if an efficient vacuum pump is present. The usable filtration time is dependent on filter size, dirt absorption capability, dust concentration and tolerable loss in flow pressure.

The invention is based on the object of indicating a new cleaning apparatus which is better suited to the needs of sufferers of allergies than the known cleaning apparatus.

This object is fulfilled by a cleaning apparatus with the features indicated in claim 1. Advantageous embodiments and developments of the invention are evident from the dependent claims.

The advantages of the invention consist particularly in that the ceramic filter retaining the allergenic substances can be cleaned or sterilised through baking organic particles by means of the claimed heating device. For this purpose, temperatures lying at least in the region of 500° C. have to be generated by means of the heating device. The ceramic material used as filter tolerates, without further measures, high temperatures of that kind by contrast to the known filters on a plastics material basis or the electrostatically charged filters.

In addition, it is achieved by the invention that the penetration behaviour of the filter can be kept almost constant over a long operating time period since particles remaining caught in the ceramic filter can be removed by regular sterilisation of the filter. Within the scope of this sterilisation, allergenic organic particles such as proteins, protein constituents and electrolytes are, in particular, incinerated and the ash particles created are discharged in the exhaust air flow. Elimination of allergenic particles in that manner is of great advantage for sufferers of allergies.

In addition, investigations have shown that germs can migrate through pores having a diameter significantly smaller than the size of the germs. Germs of the kind which develop particularly well in a moist milieu are also destroyed by the invention.

A further advantage of the invention consists in a reduced maintenance outlay, since ceramic filters are permanent filters which can also be thermally cleaned "in-line". This can also be carried out without removal of the filter from the apparatus and, in addition, entirely automatically.

The advantages of use of the features of claims 3 and 4 consist in that coarser particles and droplets which pass the water bath and which could impair the following second filter in its function are retained by the first filter. Moreover, a part of the moisture and aerosols picked up by the throughflowing air in the water bath is absorbed by the first filter. This is assisted by the fact that ceramic filters generally have a hydrophilic wetting characteristic.

Preferably an open-pore ceramic foam filter is used as first ceramic filter. This has, in advantageous manner, a polymeric frame surrounding the filter material and can be removed from the apparatus and cleaned in a rinsing machine. The polymeric frame in that case prevents the ceramic mass from breaking up and crumbling.

If the vacuum pump is arranged in the outlet channel between the two ceramic filters, then particles produced in the vacuum pump are also filtered out.

Use of several ceramic layers provided in wave shape, as indicated in claim 8, improves the filter effect. A planar format of the ceramic layers facilitates construction and heating of the filter.

A cleaning apparatus according to the invention can be, in advantageous manner, a multi-function cleaning apparatus with several operating modes. In one of these operating modes the apparatus operates, with a fitted nozzle/hose unit, as a vacuum cleaner and in a further mode of operation, with the nozzle/hose unit removed, as an air purifier.

If a pre-filter is arranged in the inlet channel of the water container, it is ensured that coarse particles, such as, for example, leaves or other objects impairing the flow channel, are filtered out even before the water bath. This pre-filter can be arranged as an easily removable functional element in the nozzle mounting region of the apparatus. The pre-filter can be mechanically cleaned or washed in simple manner after withdrawal.

A cleaning apparatus according to the invention can also be an air-conditioning apparatus which has a ceramic filter equipped with a heating device.

Figure 2:
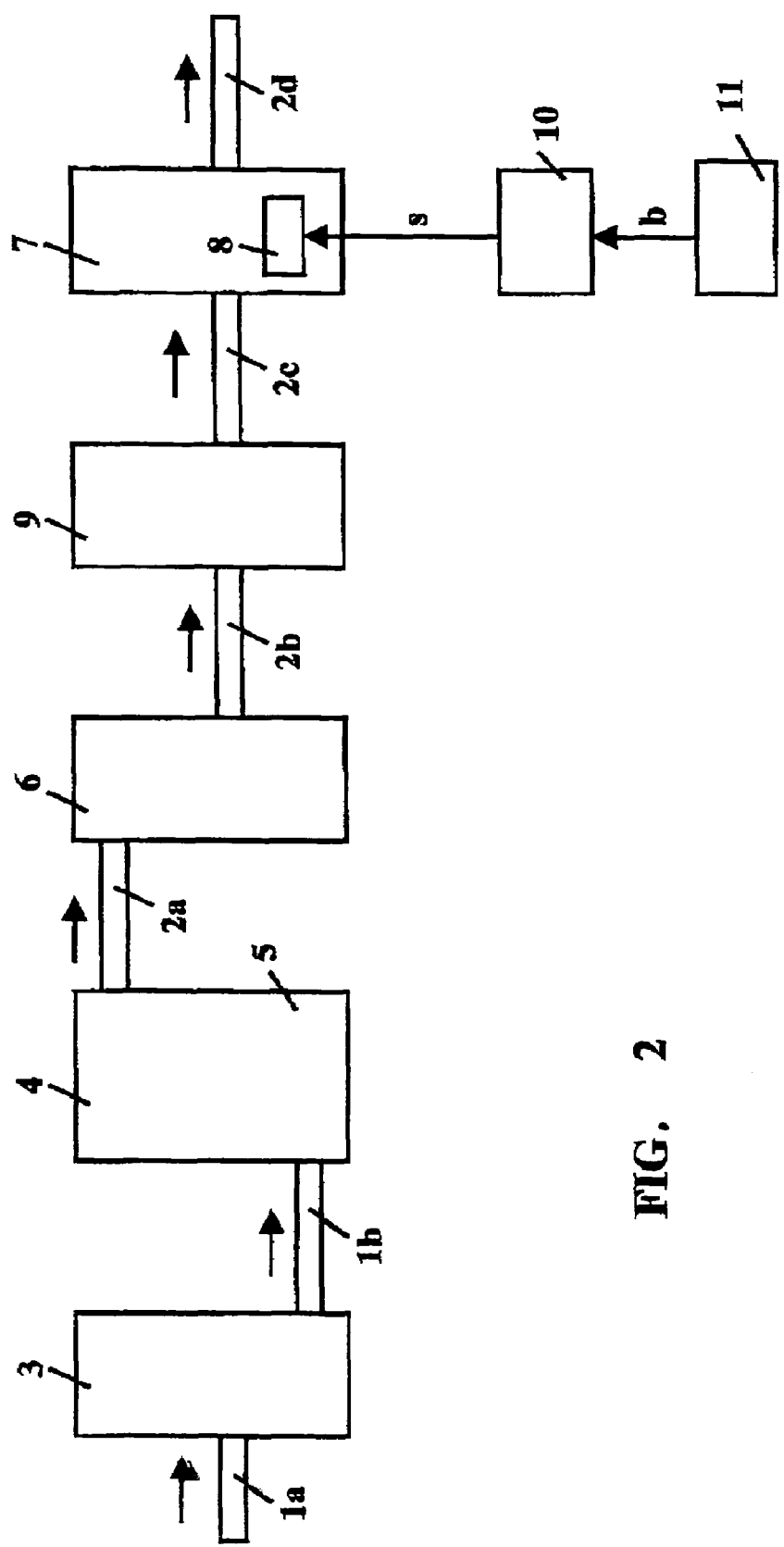
Figure 3:
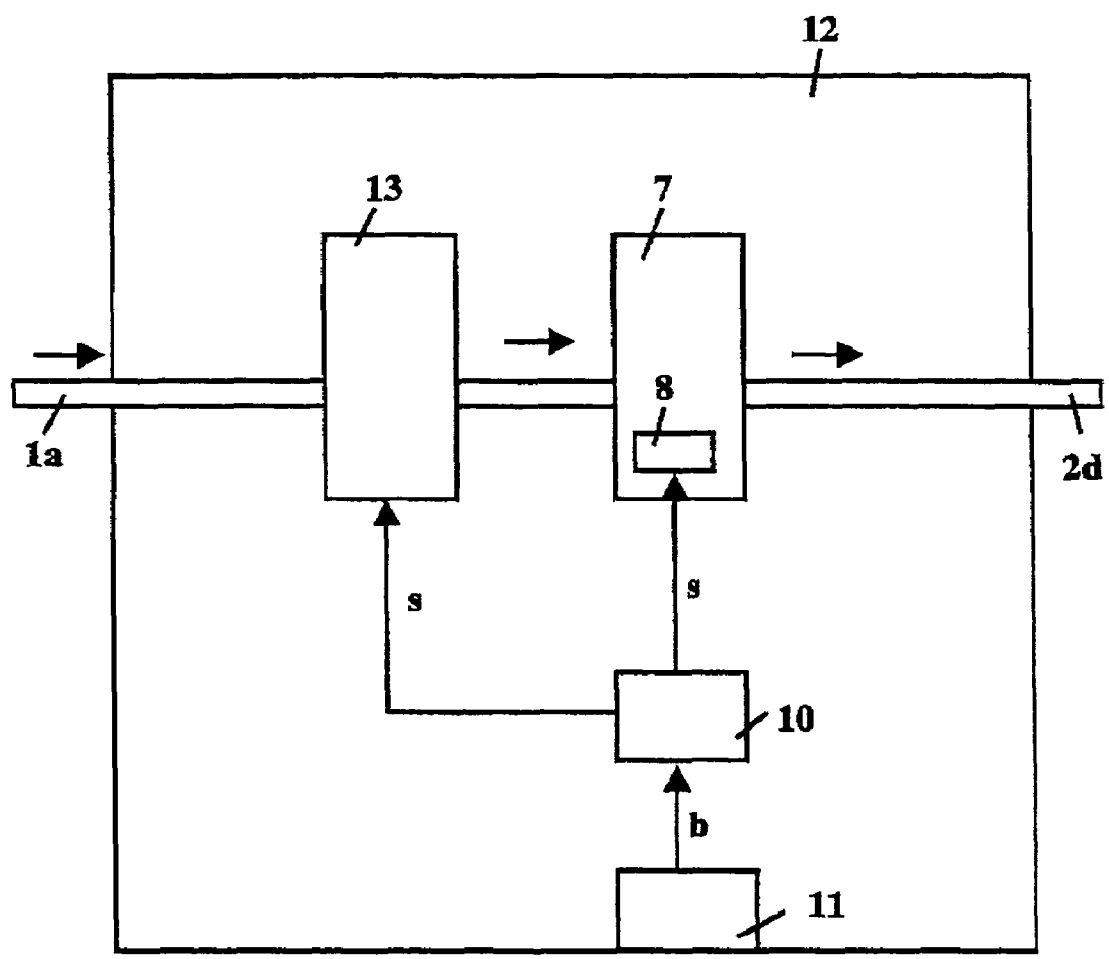

Further advantageous characteristics of the invention are evident from the explanation thereof, by way of example, with reference to the figures, in which:

FIG. 1 shows a block diagram of a first example of embodiment for a cleaning apparatus according to the invention, FIG. 2 shows a block diagram of a second example of embodiment for a cleaning apparatus according to the invention and FIG. 3 shows a block diagram of a third example of embodiment for a cleaning apparatus according to the invention.

FIG. 1 shows a block diagram of a first example of embodiment for a cleaning apparatus according to the invention. This cleaning apparatus is preferably a multi-function cleaning apparatus which is operable in different operating modes. A first operating mode is a vacuum cleaner operation in which a nozzle system/hose system is connected with the inlet of the apparatus illustrated in FIG. 1. A second mode of operation is an air washer operation in which the apparatus is operated without a connected nozzle system/hose system.

The cleaning apparatus illustrated in FIG. 1 comprises, as central cleaning element, a water bath 5 disposed in a water container 4. An inlet channel 1a, 1b, through which inducted air is conducted into the water bath, is led into this water bath.

A pre-filter 3, the task of which substantially consists in filtering out larger particles such as, for example, leaves and other objects impairing the flow channel, is arranged in the inlet channel 1a, 1b. This pre-filter consists of a polymer woven material and is so designed that it can be easily withdrawn from the apparatus and mechanically cleaned or washed down. According to an advantageous embodiment this pre-filter is inserted in the nozzle mounting region of the apparatus so that it is readily accessible.

The loaded air flow fed to the water container 4 flows through the water bath 5 in which a large part of the dust particles, germs and other organic and inorganic substances contained in the loaded air flow as well as in a given case soluble constituents contained therein are retained already. The air flow issuing at the upper side of the water bath 5 is passed on to an outlet channel 2a, 2b, 2c, 2d led out of the water container.

The filter action of the water bath 5 is based on the fact that the particles contained in the air flow experience sufficient water contact for binding. In order to achieve the desired binding, a centrifugal acceleration of the air can be undertaken and a redivision of coalesced air bubbles carried out.

The wettability of particles and water solubility of adsorbed substances play an important role in this air washing in the water bath 5. Particular attention must be paid to the intensity of the air washing and the retention of aerosols.

The coalescence of small air bubbles introduced into the water is strong. Hydrophobic particles, for example pollens, are hardly wetted and in many cases can pass directly through the water bath. Wetting can in principle be significantly improved by a small addition of a medium, for example alcohol or spirit, promoting wetting. Non-wetted particles or particles passing in air bubbles which are too large experience a specific degree of moistening in the water bath and are passed on to the outlet channel 2a, 2b, 2c, 2d led out of the water container.

A first ceramic filter 6, a second ceramic filter 7 arranged behind this and a vacuum pump 9 are provided in the outlet channel 2a, 2b, 2c, 2d, wherein the underpressure required for movement of the air flow is produced by means of the vacuum pump.

The first ceramic filter 6 is an adsorptively acting filter, the task of which substantially consists in retaining the coarser particles and droplets which pass the water bath and which could impair the following second ceramic filter 7 in its function. In addition, the first ceramic filter 6 also absorbs a part of the moisture and aerosols taken up from the air, which has flowed through, in the water bath. This is promoted by the hydrophilic wetting behaviour of the ceramic filter.

The first ceramic filter 6 consists of ceramic foam and accordingly has a large internal surface. The filter material, which is aluminium oxide, is surrounded by a polymeric frame. The first ceramic filter 6 can thereby be withdrawn in problem-free manner from the cleaning apparatus for cleaning purposes and introduced into a washing machine. The polymeric frame in that case prevents breaking-off and crumbling of the ceramic mass.

The air flow departing the first ceramic filter 6 and freed of larger particles and droplets is conducted to the second ceramic filter 7. This second ceramic filter 7 has a defined exclusion boundary which is at most 10 micrometres and preferably lies in the region of 1 micrometre. All particles contained in the air flow and larger than the exclusion boundary of this second ceramic filter are filtered out by the second ceramic filter 7, i.e. retained. The second ceramic filter 7 comprises several ceramic layers arranged parallel to one another and are formed to be either planar or of wave shape.

Also belonging to the particles retained in the second ceramic filter 7 are germs and the above-mentioned allergenic substances such as proteins, protein constituents and electrolytes.

Since organic substances of that kind can develop particularly well in the moist milieu which is present and since germs can also migrate through pores having a diameter significantly smaller than the diameter of the germs, there is carried out in accordance with the invention a sterilisation of the filter device arranged behind the water bath.

This sterilisation is carried out with use of a heating element 8 arranged in the second ceramic filter 7. In order to perform the sterilisation, the second ceramic filter 7 is heated up by means of the heating element 8 to a temperature lying in the region of 500° C. The sterilisation is undertaken, for example, before or after each use of the apparatus. Preferably, this takes place automatically as a reaction to actuation of the switching-on and/or switching-off button 11 of the apparatus.

This actuation of the switching-on and/or switching-off button 11 of the apparatus is signalled in the form of a operating command, which is conducted by way of a connection b, of a control unit 10, which is preferably constructed as a microcomputer. The control unit 10 generates, as a reaction to the switching-on or switching-off of the apparatus, a control command which is supplied by way of the connection s to the heating element 8 in order to heat up the second ceramic filter 7 for the purpose of sterilisation.

The above-mentioned organic particles are incinerated by this heating up. The ash particles which arise in that case and which do not have any allergenic constituents are sucked out of the second ceramic filter 7 as a component of the air flow.

Additionally or alternatively to sterilisation when the apparatus is switched on and switched off, a sterilisation can also be carried out automatically after expiry of predetermined time periods. For this purpose the control unit 10 is provided with a timer function or with an operating hour counter. For example, a control signal triggering the heating-up process can be given by the control unit 10 to the heating element 8 by way of the connection s after every expiry of three operating hours of the apparatus.

The duration in time of the heating-up process amounts to, for example, 1 minute. After expiry of this time the heating 8 is again automatically deactivated by the control unit 10.

The maintenance cost for the user is substantially reduced by this possibility of a thermal cleaning, which takes place automatically, of a ceramic filter which withstands the requisite high temperatures without further measures.

Since the particles remaining caught in the second ceramic filter 7 are constantly incinerated after a short operating time of the apparatus and the ash particles arising in that case are separated out, the penetration characteristic of the second ceramic filter 7 remains substantially constant even after a longer operating time of the apparatus, which is an important precondition for the usability, in practice, of a filter with pore sizes in the above-mentioned micrometre range. Allergenic organic particles and germs are eliminated by the described sterilisation.

Consequently, there is made available by the invention an economic, sterile cleaning apparatus which is also suitable for sufferers of allergies and the filters of which downstream of the water bath are permanent filters which have a significantly reduced maintenance cost and securely retain micro-organisms.

FIG. 2 shows a block diagram of a second example of embodiment for a cleaning apparatus according to the invention. This differs from the first example of embodiment shown in FIG. 1 merely in that the vacuum pump 9 is arranged between the first ceramic filter 6 and the second ceramic filter 7. The advantage of this form of embodiment consists in that particles produced in the vacuum pump are also filtered out by the filter 7 and consequently are not delivered to the environment.

In the foregoing the invention was explained in more detail on the basis of the examples of embodiment shown in FIGS. 1 and 2. According to further forms of embodiment, which are not illustrated in the figures, of the invention it is possible to, for example, omit the prefilter 3, also equip the first ceramic filter with heating means for sterilisation of the filter and also operate with a blower instead of the vacuum pump.

An advantageous refinement of the cleaning apparatus according to the invention consists in equipping this with a sensor for pollutants. This sensor measures the instantaneously present loading of the air with formaldehydes, cigarette smoke, etc., and indicates the measured pollutant content with use of an optical indicator, for example a light-emitting diode chain. This pollutant sensor is arranged, for example, in the transition region between the nozzle system/hose system and the inlet channel 1a of the water container. The pollutant sensor is deactivated in vacuum cleaner operation and active only in air purifying operation. Deactivation of the pollutant sensor in vacuum cleaner operation is achieved in that when the nozzle system/hose system is plugged on, a contact element deactivating the pollutant sensor is automatically actuated. If the nozzle system/hose system is removed for carrying out air purifying operation, the contact element is then actuated again and the pollutant sensor thereby further activated.

In a further mode of operation of the cleaning apparatus this is used as wet cleaning apparatus. This wet cleaning is carried out with use of a hydroelectric module realised as a plug module. When the module is plugged onto the apparatus the necessary electrical contact and the wet hose connection contact are automatically produced. In this wet cleaning mode of operation, wet cleaning can be carried out of, for example, floor coverings, carpeted floors, upholstery of any kind or windows, wherein in a first step the cleaning liquid, for example water mixed with a cleaning additive, is sprayed into the medium to be cleaned and in a second step sucked away again together with the removed particles of dirt.

FIG. 3 shows a block circuit diagram of a third example of embodiment for a cleaning apparatus according to the invention. This cleaning apparatus is an air-conditioning apparatus 12 such as used in closed rooms for setting a desired room temperature. This air-conditioning apparatus, by means of which an air flow entering by way of an inlet channel 1a is heated or cooled in a temperature regulator 13, contains in accordance with the invention a filter device which comprises a ceramic filter 7 equipped with a heating device 8. The pore diameter of this ceramic filter is less than 10 micrometres.

In operation of the air-conditioning apparatus, allergenic particles remain caught in the ceramic filter. These are incinerated by thermal sterilisation of the ceramic filter 7 with use of the heating device 8 and separated out in the form of very small ash particles which do not contain any allergenic constituents. The heating process is controlled by a control unit 10 which activates the heating device 8 for thermal sterilisation of the ceramic filter 7 either after actuation of a switching-on or switching-off button 11 of the apparatus or at intended operating time intervals. The air flow issuing from the ceramic filter 7 is delivered by way of the outlet channel 2d to the respective room.

A filter device comprising a ceramic filter 7 equipped with a heating device 8, wherein the pore diameter of the ceramic filter is less than 10 micrometres and wherein the heating device for thermal sterilisation of the ceramic filter is provided, can also be marketed in the sense of a replacement part transaction independently of a cleaning apparatus and used for replacement of defective filters or for installation in other apparatus.

REFERENCE NUMERAL LIST

1a, 1b inlet channel
2b, 2c, 2d outlet channel
3 prefilter
4 water container
5 water bath
6 first ceramic filter
7 second ceramic filter
8 heating means
9 vacuum pump
10 heating control
11 control knob
12 air-conditioning apparatus
13 temperature regulator
b connection for transmission of an operating signal
s connection for transmission of a control signal

The invention claimed is:

1. Cleaning apparatus comprising a filter device, which comprises:
 a water container;
 an inlet channel connected directly with and for supplying water into the water container;
 an outlet channel connected directly with and for removing water out of the water container, the filter device arranged in the outlet channel comprising a ceramic filter; and
 a heating device, the heating device being arranged in the ceramic filter, wherein the pore diameter of the ceramic filter is less than 10 micrometers and wherein the heating device is provided for thermal sterilization of the ceramic filter by heating up the ceramic filter to a temperature of at least 500 ° C.

2. Cleaning apparatus according to claim 1, wherein the filter device comprises two ceramic filters arranged one behind the other.

3. Cleaning apparatus according to claim 1, wherein the ceramic filter equipped with the heating device comprises a plurality of ceramic layers which are planar or extend in wave shape.

4. Cleaning apparatus according to claim 1, wherein the heating device is connected with a control unit.

5. Cleaning apparatus according to claim 4, wherein the control unit automatically activates the heating device on actuation of the switching-on and/or switching-off button of the cleaning apparatus.

6. Cleaning apparatus according to claim 4, wherein the control unit activates the heating device automatically at predetermined operating time intervals.

7. Cleaning apparatus according to claim 1, wherein it is a multi-function cleaning apparatus operable in different operating modes.

8. Cleaning apparatus according to claim 7, wherein a first operating mode is a vacuum cleaner operation and a second operating mode is an air cleaning operation.

9. Cleaning apparatus according to claim 1, wherein it comprises a pre-filter arranged in the inlet channel.

10. Cleaning apparatus according to claim 9, wherein the pre-filter consists of polymer woven material.

11. Cleaning apparatus according to claim 1, wherein it is an air-conditioning apparatus.

12. Cleaning apparatus comprising a filter device, which comprises a ceramic filter and a heating device arranged in the ceramic filter, wherein the pore diameter of the ceramic filter is less than 10 micrometers, wherein the heating device is provided for thermal sterilization of the ceramic filter by heating up the ceramic filter to a temperature of at least 500° C., wherein the filter device comprises two ceramic filters arranged one behind the other in an outlet channel, and wherein the first ceramic filter arranged in an outlet channel is an adsorption filter which is provided for filtering out coarser particles and droplets and the second ceramic filter arranged in the outlet channel is the ceramic filter equipped with the heating device.

13. Cleaning apparatus according to claim 12, wherein the first ceramic filter arranged in the outlet channel is a ceramic foam filter.

14. Cleaning apparatus according to claim 13, wherein the first ceramic filter arranged in the outlet channel comprises aluminium oxide as filter material.

15. Cleaning apparatus according to claim 13 wherein the first ceramic filter arranged in the outlet channel comprises a frame consisting of polymer material.

16. Cleaning apparatus comprising a filter device, which comprises a ceramic filter and a heating device, the heating device being arranged in the ceramic filter, wherein the pore diameter of the ceramic filter is less than 10 micrometers and wherein the heating device is provided for thermal sterilization of the ceramic filter by heating up the ceramic filter to a temperature of at least 500° C, wherein the filter device comprises two ceramic filters one behind the other and wherein the filter device comprises a vacuum pump arranged in the outlet channel between the two ceramic filters.

17. Cleaning apparatus comprising a filter device, which comprises a ceramic filter and a heating device, the heating device being arranged in the ceramic filter, wherein the pore diameter of the ceramic filter is less than 10 micrometers and wherein the heating device is provided for thermal sterilization of the ceramic filter by heating up the ceramic filter to a temperature of at least 500° C., wherein the filter device comprises two ceramic filters one behind the other and wherein the filter device comprises a vacuum pump arranged in the outlet channel behind the two ceramic filters.

18. Cleaning apparatus comprising a filter device, which comprises a ceramic filter and a heating device, the heating device being arranged in the ceramic filter, wherein the pore diameter of the ceramic filter is less than 10 micrometers and wherein the heating device is provided for thermal sterilization of the ceramic filter by heating up the ceramic filter to a temperature of at least 500° C., and which comprises a prefilter arranged in a nozzle mounting region of the cleaning apparatus to be withdrawable.

* * * * *